United States Patent Office 2,798,069
Patented July 2, 1957

2,798,069
WERNER COMPLEXES OF HYDROXYALKYL PYRIDINES

William D. Schaeffer, Berkeley, Calif., assignor to Union Oil Company of California, Los Angeles, Calif., a corporation of California No Drawing. Application November 4, 1954,
Serial No. 466,937

7 Claims. (Cl. 260—270)

This invention relates to a new class of complexes of the Werner type, wherein a divalent metal salt is coordinated with an organic nitrogen base. More specifically, the divalent metal salts are those of the metals manganese, iron, cobalt and nickel, wherein the anion is monovalent. The organic nitrogen bases with which the metal salt is coordinated comprise certain hydroxy-lower alkyl derivatives of pyridine. The new complexes may be designated by the formula:

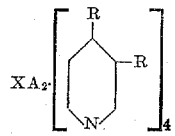

wherein X is manganese, iron, cobalt or nickel, A is a monovalent anion, at least one R group is a hydroxy-lower alkyl substituent, and any R group not so constituted is hydrogen or lower alkyl.

The new complexes are useful as selective clathrate-formers for separating mixtures of organic compounds which are chemically and physically similar, but which differ in molecular configuration. For example, when the solid complexes are triturated with, or formed in the presence of, a liquid mixture of isomeric xylenes it is found that one xylene isomer is selectively integrated into the crystal structure, forming what is presently regarded as a "clathrate." The solid clathrate may then be separated from the liquid phase, and decomposed with acid or heat to recover the selectively clathrated hydrocarbon. The herein claimed complexes are of particular value for separating xylenes because the above defined pyridine derivatives are all relatively high-boiling compounds, and hence may be easily separated from the clathrated xylenes which boil at 139–145° C. Other pyridine bases such as gamma picoline (B. P. 143° C.) are disadvantageous from this standpoint. In addition the functional groups in the R positions above defined, are substantially neutral in character, and are found to display little if any tendency to form secondary coordinate bonds with the above metal salts. In all cases the complexes formed are believed to result from the coordination of the heterocyclic nitrogen atom with the metal atom.

The new complexes may be easily prepared by simply admixing the proper mole ratios of metal salt and the desired hydroxyalkyl pyridine, normally at room temperatures, although higher or lower temperatures may be employed. If desired the metal salt, $XA_2$, may be first dissolved in a solvent such as water, and the complex precipitated by addition of the substituted pyridine compound. The precipitated complex is then separated by filtration and dried at low temperatures, e. g. 20–80° C. in order to avoid volatilization of the hydroxyalkyl pyridine. The actual final mole proportion of substituted pyridine in the solid complex may vary somewhat, inasmuch as di-coordinate, tri-coordinate, tetra-coordinate, or hexa-coordinate complexes may be formed to some extent, but those complexes containing substantially 4 moles of nitrogen base per mole of metal salt are preferred.

Suitable metal salts include the halides, nitrites, nitrates, thiocyanates, isothiocyanates, cyanides, azides, cyanates, isocyanates, formates, acetates, and the like. Specific examples of such salts are:

Nickelous chloride
Nickelous nitrite
Nickelous thiocyanate
Manganous chloride
Manganous cyanide
Cobaltous bromide
Cobaltous acetate
Ferrous thiocyanate
Ferrous cyanate When working in aqueous solutions, it is not essential to employ the actual salt desired in the final complex; the desired salt may be formed in situ by metathesis during the formation of the complex, as for example:

$$FeSO_4 + 2NaSCN \rightarrow Fe(SCN)_2 + Na_2SO_4$$

The $Fe(SCN)_2$ forms a less soluble complex with the added pyridine derivative than does the $FeSO_4$, and hence the above equation is driven substantially to completion, with formation of the highly insoluble ferrous thiocyanate complex. Where the desired complex is more soluble in water, other solvents may be employed, or the complex may be prepared in the dry state, as by passing vapors of the substituted pyridine over the desired metal salt. Many other methods of preparation will be apparent to those skilled in the art.

*Example*

The invention is further illustrated, but is not limited, by the following technique which was utilized for preparing a specific member of the herein claimed complexes:

(1) A concentrated aqueous solution, A, was prepared containing one mole proportion of nickel dithiocyanate. This solution was actually formed by dissolving one mole proportion of nickel chloride and two mole proportions of sodium thiocyanate in the solution.

(2) A second concentrated aqueous solution was prepared containing 4 mole proportions of 4-hydroxymethyl pyridine (B.P. 124–126° C. at 4 mm.). This mixture is designated B.

(3) Solutions A and B were then mixed together with stirring, whereupon a blue precipitate was formed.

(4) The precipitate was filtered off and washed with cold water, and the washed solid was dried to constant weight in an air stream at 24–100° C. The yield was substantially theoretical.

The dried product was a blue, crystalline solid melting at 237° C. By elemental analysis it was found to contain 50.9 weight-percent carbon and 13.6 weight-percent nitrogen. The calculated theoretical carbon and nitrogen values for the complex, nickel tetra(4-hydroxymethyl pyridine) dithiocyanate, are 51.08% and 13.7% respectively. The product therefore had the formula:

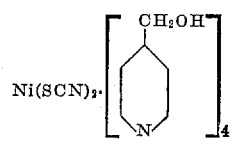

This complex is found to exhibit selective clathrating properties for ortho-xylene in strong preference to ethylbenzene, and in slight preference to meta-xylene. For example when a mixture comprising 19.9% by volume of p-xylene, 45.5% m-xylene, 19.3% o-xylene and 15.3% ethylbenzene was contacted with the complex while the latter was being precipitated by cooling from a methyl Cellosolve solution, the resulting solid clathrate was found to contain a hydrocarbon phase composed of 21.7% p-xylene, 42.6% m-xylene, 35.7% o-xylene and 0% ethylbenzene.

Other complexes within the scope of the appended claims may be prepared by procedures analogous to that of the example, merely by substituting appropriate hydroxyalkyl pyridines, and/or the appropriate metal salts. Examples of such additional complexes which are contemplated herein are as follows:

1. Nickel tetra [4-(β-hydroxyisopropyl) pyridine] dithiocyanate.
2. Nickel tetra [3,4-di(hydroxymethyl) pyridine] dithiocyanate.
3. Cobalt tetra [3-(α-hydroxyethyl) pyridine] diformate.
4. Cobalt tetra(3-hydroxymethyl pyridine) dichloride.
5. Ferrous tetra(4-hydroxymethyl, 3-methyl pyridine) dithiocyanate.
6. Ferrous tetra [3-(β-hydroxyethyl),4-methyl pyridine] dicyanate.
7. Manganous tetra [4-(β-hydroxyisopropyl) pyridine] dinitrite.
8. Manganous tetra [3-(β-hydroxyethyl),4-hydroxymethyl pyridine] dicyanide.
9. Manganous tetra [4-(4-hydroxy n-butyl) pyridine] dithiocyanate.

All of the above complexes are found to exhibit selective clathrating properties which render them useful for effecting difficult separations. In addition to their use as clathrate formers, the complexes are also useful in other fields as e. g. insecticides, oil-soluble metal carriers, oxidation accelerators for paints and the like. Their solubility in most organic solvents, e. g. chloroform, renders them useful as impregnants for intimately depositing catalytic materials on hydrophobic surfaces as e. g. activated carbon and the like. Other uses will be apparent to those skilled in the art.

Other specific complexes, methods of preparation and uses will readily occur to those skilled in the art. The true scope of the invention is intended to be embraced by the following claims.

I claim:

1. A tetra-coordinated Werner complex composed of (1) one mole of a monovalent-anion-salt of a divalent metal having an atomic number between 25 and 28 inclusive and (2) four moles of a substituted-pyridine base having the formula:

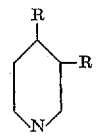

wherein at least one R group is a hydroxy-lower alkyl substituent, and any R group not so constituted is selected from the group consisting of hydrogen and lower alkyl, said anion being selected from the group consisting of formate, nitrite, halide, cyanide, cyanate and thiocyanate.

2. A Werner complex as defined in claim 1 wherein said anion is thiocyanate.

3. Nickel tetra(4-hydroxymethyl pyridine) dithiocyanate.

4. Nickel tetra [4-(β-hydroxyisopropyl) pyridine] dithiocyanate.

5. Nickel tetra [3,4 di(hydroxymethyl) pyridine] dithiocyanate.

6. Manganous tetra [4-(β-hydroxyisopropyl) pyridine] dinitrite.

7. Cobalt tetra [-(α-hydroxyethyl) pyridine] diformate.

References Cited in the file of this patent

Sacconi: Ann. Chim., vol. 40, pp. 386–95 (1950).
Ploquin: Compte rendus, vol. 233, pp. 162–64 (1951).

UNITED STATES PATENT OFFICE

CERTIFICATE OF CORRECTION

Patent No. 2,798,069                                          July 2, 1957

William D. Schaeffer

It is hereby certified that error appears in the printed specification of the above numbered patent requiring correction and that the said Letters Patent should read as corrected below.

Column 4, line 32, for "[-($\alpha$-hydroxyethyl)" read --[3-($\alpha$-hydroxyethyl)--.

Signed and sealed this 24th day of September 1957.

(SEAL)
Attest:
KARL H. AXLINE
Attesting Officer

ROBERT C. WATSON
Commissioner of Patents